United States Patent
Sarin et al.

(10) Patent No.: US 8,230,031 B2
(45) Date of Patent: Jul. 24, 2012

(54) SYSTEM AND METHOD FOR PROVIDING ENHANCED INSTANT MESSAGING

(75) Inventors: Anil Sarin, Delhi (IN); Raveendran Vadakkoot, Thrissur (IN)

(73) Assignee: Infosys Technologies Limited (IN)

( * ) Notice: Subject to any disclaimer, the term of this patent is extended or adjusted under 35 U.S.C. 154(b) by 105 days.

(21) Appl. No.: 12/714,713

(22) Filed: Mar. 1, 2010

(65) Prior Publication Data

US 2011/0213846 A1 Sep. 1, 2011

(51) Int. Cl.
G06F 15/16 (2006.01)

(52) U.S. Cl. ....................................... 709/206

(58) Field of Classification Search ................. 709/204, 709/207, 206; 715/762; 707/3
See application file for complete search history.

(56) References Cited

U.S. PATENT DOCUMENTS

| | | | |
|---|---|---|---|
| 2004/0039731 A1* | 2/2004 | Levy | 707/3 |
| 2007/0043821 A1* | 2/2007 | Brumfield | 709/207 |
| 2008/0005681 A1* | 1/2008 | Cohen et al. | 715/762 |
| 2008/0046512 A1* | 2/2008 | Jones et al. | 709/204 |
| 2009/0006548 A1* | 1/2009 | Ramanathan et al. | 709/204 |
| 2009/0055497 A1* | 2/2009 | Dickerson et al. | 709/207 |

* cited by examiner

Primary Examiner — Jungwon Chang
(74) Attorney, Agent, or Firm — Lerner, David, Littenberg, Krumholz & Mentlik, LLP (57) ABSTRACT

A method of enhanced instant messaging in a communication network is provided. The method comprises instantiating an instant query message received from a message initiator as a message object. The method further comprises assigning a context identifier and a context queue to the message object based on a context of the message object. The message object is delegated to one or more users if a reply to the message object is not available in a database. Thereafter, one or more replies received for the message object are aggregated in the context queue of the message object and at least one reply is sent to the message initiator.

15 Claims, 6 Drawing Sheets

SYSTEM AND METHOD FOR PROVIDING ENHANCED INSTANT MESSAGING

FIELD OF INVENTION

The present invention is directed towards providing instant messaging services. More particularly, the present invention provides a system and method for providing enhanced instant messaging to users.

BACKGROUND OF THE INVENTION

Instant Messaging is a form of communication that facilitates multiple users to interact in real time through their electronic communication devices. Examples of electronic communication devices that facilitate instant messaging include, but are not limited to, mobile phones, laptops, personal computers and Personal Digital Assistants (PDAs). An electronic communication device may include one or more IM modules to facilitate exchange of instant messages among users. An instant message can be a text, image, audio, or video message.

Presently, instant messaging is widely used in a customer helpdesk environment. A customer helpdesk environment includes a helpdesk support team that can address and resolve queries/issues of one or more customers via instant messaging. A first customer may initiate a first instant messaging session with a first helpdesk executive for receiving assistance on one or more queries/issues. Usually, the first helpdesk executive is able to answer queries of customers on his own. However, there may be a situation, when the first helpdesk executive may not be able to answer a query of a customer. Therefore, the first helpdesk may initiate a second instant messaging session with a second helpdesk executive in order to seek his opinion/reply. To seek opinion/reply on the query, the first helpdesk executive may manually copy the query and paste in the second instant messaging session. When the second helpdesk executive provides a reply to the query, the first helpdesk executive manually copies the reply and pastes it in the first instant messaging session.

The process of manually copying and pasting the queries/replies in instant messaging sessions is quite time consuming. Further, there may be a situation when a second customer sends similar query to the first helpdesk executive at a later point of time. The first helpdesk executive may repeat the process of receiving reply from the second helpdesk executive. The repetitive process of seeking replies on the same query results in inefficiency in the helpdesk support team.

Further, in a multi-user instant messaging session, multiple users exchange messages with each other. There may be a situation when a new user joins in a middle of a multi-user IM session. The users already engaged in conversation may restrict the new user to see some of the messages generated prior to his joining the instant messaging session. There is no provision in prior art which can restrict a user to see some messages generated in a multi-user instant messaging session.

In light of the abovementioned disadvantages, there is a need for a method and system that facilitates forwarding/delegation of messages among multiple users. Further, there should be a provision of archiving queries and corresponding replies in order to retrieve replies for recurring queries. Furthermore, there is a need for a method and system which provides selective visibility of messages to a user in a multi-user IM session.

BRIEF SUMMARY OF THE INVENTION

A method of enhanced Instant Messaging (IM) in a communication network is provided. The method comprises firstly instantiating an instant query message received from a message initiator as a message object. Secondly, assigning a context identifier and a context queue to the message object based on context of the message object. Next, delegating the message object to one or more users if a reply to the message object is not available in a database. Then, aggregating one or more replies received for the message object in the context queue of the message object. Finally, sending at least one reply to the message initiator. In an embodiment of the present invention, the message object is delegated according to a privacy level of the message object.

In an embodiment of the present invention, the method further comprises detecting arrival of one or more replies to the message object. In another embodiment of the present invention, the method further comprises moderating one or more replies prior to sending at least one reply to the message initiator.

In an embodiment of the present invention, the method further comprises firstly tagging the message object and secondly archiving a set of message object and corresponding replies in the database.

In an embodiment of the present invention, one or more users are technical experts of a customer helpdesk environment. In another embodiment of the present invention, an instant message is one of the following: text message, image message, audio message or video message.

A method of enhanced instant messaging in an instant messaging environment with a distinguished user is provided. The method comprises firstly instantiating one or more instant query messages received from one or more message initiators as message objects. Secondly, assigning context queues and context identifiers to the message objects based on context of the message objects. Next, sending the message objects to a lead moderator. Then, delegating one or more message objects to one or more sub-moderators. Further, receiving moderated message objects from one or more sub-moderators. Finally, presenting the moderated message objects to the distinguished user.

In an embodiment of the present invention, the method further comprises moderating one or more message objects prior to delegating message objects to one or more sub-moderators. In another embodiment of the present invention, the method further comprises compiling and arranging the moderated message objects in a sequence preferred by the distinguished user.

In an embodiment of the present invention, the method further comprises firstly receiving one or more replies by the lead moderator from the distinguished user. Secondly, moderating one or more replies. Next, sending one or more replies to one or more message initiators.

In an embodiment of the present invention, the method further comprises firstly detecting arrival of one or more replies at one or more message initiators. Secondly, tagging one or more message objects. Next, archiving a set of message objects and corresponding replies in a database.

An instant messaging module for facilitating enhanced instant messaging in a communication network is provided. The IM module comprises a message generator configured to represent an instant message as a message object, and assign a context identifier to the message object based on context of the message object. The IM module further comprises a message queue manager configured to assign a context queue to the message object based on context of the message object, a message delegator configured to delegate a message object to one or more users according to a privacy level of the message object, a reply aggregator configured to aggregate one or more replies for the message object in the context queue of the message object, a message status detector configured to detect an arrival of one or more replies to the message object, a message tagger configured to facilitate context-based tagging of the message object, and a message archiver configured to facilitate context-based archiving of the message object and corresponding replies.

In an embodiment of the present invention, the instant messaging module further comprises a message moderator configured to moderate content of one or more message objects and a message context maintainer configured to maintain multiple contexts in an IM session.

BRIEF DESCRIPTION OF THE DRAWINGS

The present invention is described by way of embodiments illustrated in the accompanying drawings wherein.

DETAILED DESCRIPTION

A system and method for providing enhanced Instant Messaging (IM) in a communication network are described herein. The present invention provides a means for instantiating an instant message as a message object and assigning context based identifier to the message object. The present invention also provides a means for context based queuing, tagging, and archiving of instant messages. The present invention further provides a means for delegating instant messages to other users in an IM session according to privacy level of instant messages. The present invention furthermore provides a means for selective visibility of one or more message objects to one or more users in a multi-user IM session. The method of the invention may be provided on a computer readable medium.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For the purpose of clarity, details relating to technical material that are known in the technical fields related to the invention have not been described in detail so as not to unnecessarily obscure the present invention.

The present invention would now be discussed in context of embodiments as illustrated in the accompanying drawings.

Figure 1:
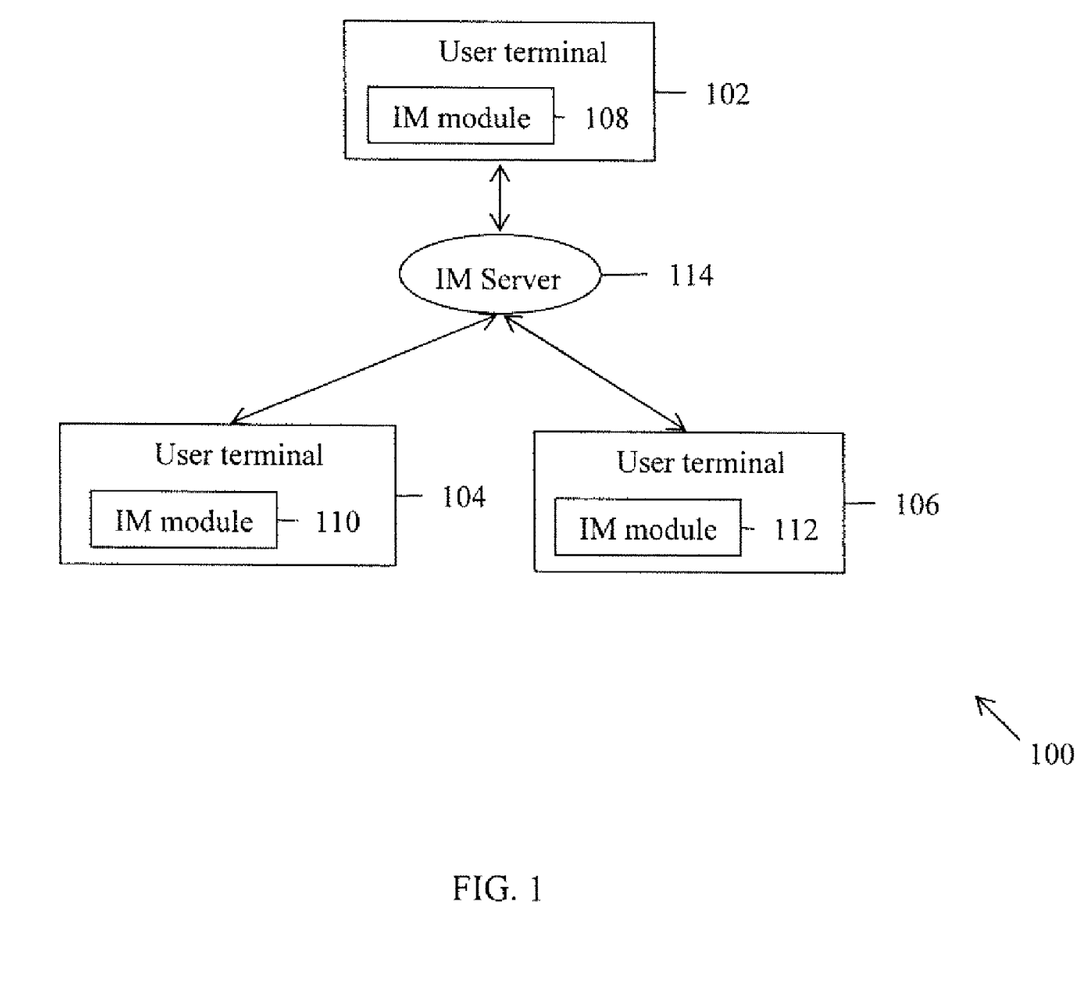
FIG. 1 illustrates a block diagram of a communication network for providing enhanced Instant Messaging.

FIG. 1 illustrates a block diagram of a communication network 100 for providing enhanced Instant Messaging (IM) to one or more users. Communication network 100 comprises user terminals 102, 104, and 106, IM modules 108, 110 and 112, and an IM Server 114. In various embodiments of the present invention, user terminals 102, 104, and 106 may be hereinafter collectively referred to as user terminals and IM Modules 108, 110, and 112 may be hereinafter collectively referred to as IM modules.

Communication network 100 is a network in which one or more electronic communication devices are interconnected to facilitate enhanced IM among multiple users. Communication network 100 may be either a wired network or a wireless network. Examples of communication network 100 may include, but are not limited to, internet, intranet, Local Area Network (LAN), Wide Area Network (WAN), and Metropolitan Area Network (MAN).

User terminals 102, 104, and 106 are electronic communication devices used by end users to exchange instant messages in communication network 100. User terminals facilitate generation and display of text, image, audio and video messages for IM. Examples of user terminals may include, but are not limited to, personal computers, Personal Digital Assistants (PDAs), mobile phones, blackberries, portable devices, and hand-held devices. In various embodiments of the present invention, user terminals 102, 104, and 106 are used by a first, second, and third user respectively. The first, second, and third user may be hereinafter collectively referred to as users.

IM modules 108, 110, and 112 are software entities that are installed on user terminals 102, 104, and 106 respectively. IM modules facilitate users to initiate one or more IM sessions for exchanging instant messages. In various embodiments of the present invention, IM modules may provide enhanced IM services to first, second, and third users. Various enhanced features and services provided by an IM module are explained in detail with reference to FIG. 2.

IM Server 114 is a computing unit that manages and coordinates the operation of IM modules in communication network 100. In an embodiment of the present invention, the instant messages exchanged among multiple users are routed through IM Server 114. In another embodiment of the present invention, IM Server 114 may store information pertaining to users such as user names and availability status of users. In yet another embodiment of the present invention, IM Server 114 may maintain information on multiple IM sessions initiated in communication network 100 and manage users participating in multiple IM sessions.

Figure 2:
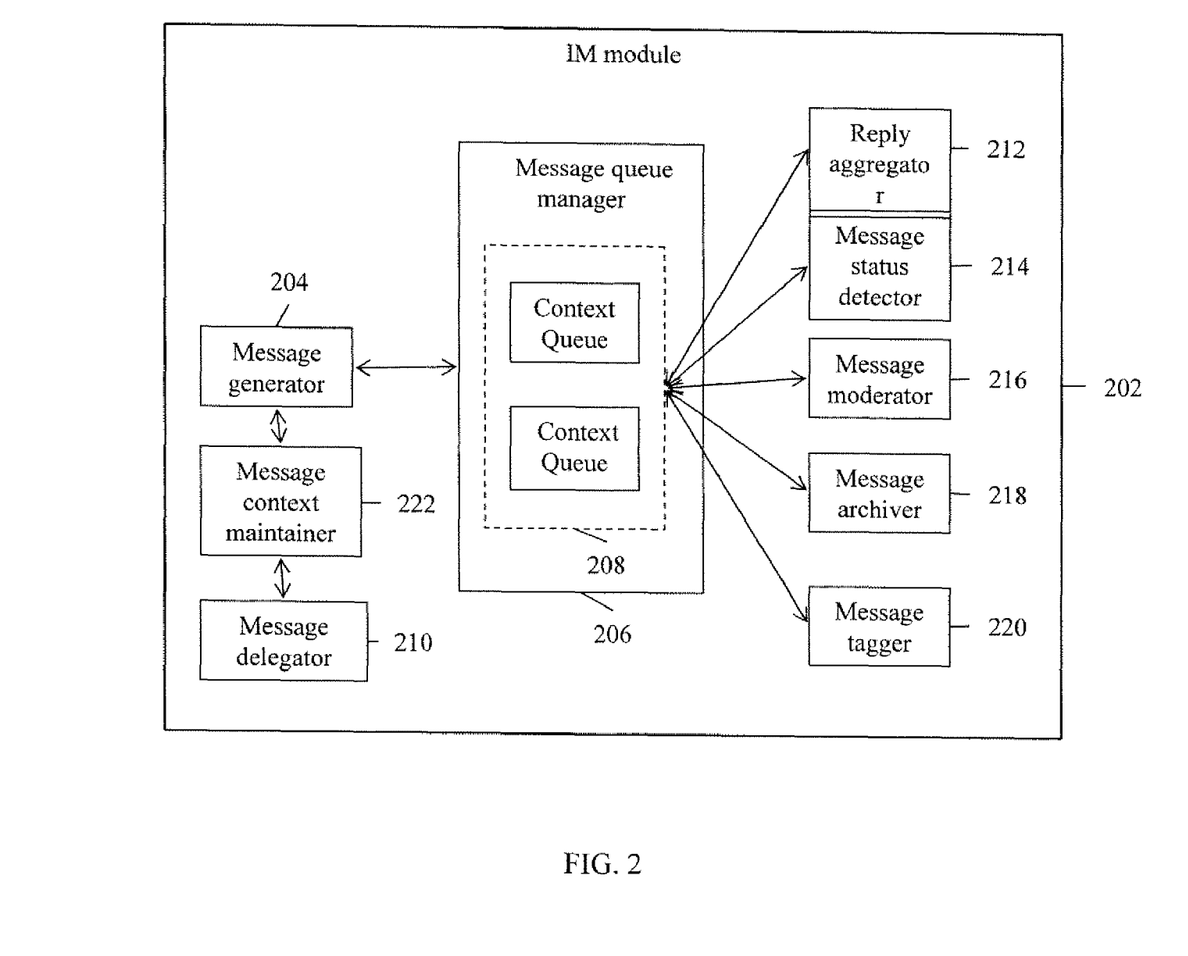
FIG. 2 illustrates a block diagram of an Instant Messaging (IM) module for facilitating enhanced IM.

FIG. 2 illustrates a block diagram of an Instant Messaging (IM) module 202 for facilitating enhanced IM in communication network 100. IM module 202 comprises multiple modules such as a message generator 204, a message queue manager 206, context queues 208, a message delegator 210, a reply aggregator 212, a message status detector 214, a message moderator 216, a message archiver 218, a message tagger 220 and a message context maintainer 222.

In an embodiment of the present invention, one or more modules of IM module 202 may be installed on each of the user terminals and may be referred to as client modules. In another embodiment of the present invention, one or more modules of IM module 202 may be installed on IM Server 114 (FIG. 1) and may be referred to as server modules.

IM module 202 facilitates users to initiate one or more IM sessions for exchanging instant messages. In an embodiment of the present invention, IM sessions initiated using IM module 202 facilitates context based IM. In context based IM, instant messages exchanged among users are categorized/ classified according to their respective contexts/topics. As a result, a single IM session may comprise multiple discussion threads, where each discussion thread comprises instant messages of similar context. In various embodiments of the present invention, an instant message participating in a context based IM session is a self-contained object and can be referred to as a message object.

Message generator 204 is a module that facilitates instantiating an instant message as a self-contained message object in an IM session. Further, message generator 204 assigns a context identifier to each new message object generated in an IM session. The context identifier is assigned to a message object based on context of the message object. In an embodiment of the present invention, when a message object is generated in response to a previous instant message of an IM session, context identifier of the previous instant message is assigned to the message object. In another embodiment of the present invention, when a message object has a new context, a new context identifier is created and assigned to the message object.

In various embodiments of the present invention, message generator 204 may facilitate digital signing of one or more message objects in an IM session. In an embodiment of the present invention, a message object of an IM session may be digitally signed by assigning a password to the message object. In another embodiment of the present invention, an IM session may be digitally signed by assigning a password to the IM session.

Message queue manager 206 is a module that manages context based queuing of message objects generated in multiple IM sessions. A context queue is a message queue which comprises message objects of similar context. In an embodiment of the present invention, message queue manager 206 facilities queuing of message objects into multiple context queues 208, present at IM Server 114 (FIG. 1).

In various embodiments of the present invention, message queue manager 206 may assign a context queue to a new message object based on context of the message object. In an embodiment of the present invention, when a message object is generated in response to a previous instant message of an IM session, the message object is queued into a context queue of the previous instant message. In another embodiment of the present invention, when a message object has a new context, a new context queue is created at IM Server 114 (FIG. 1) and the message object is queued into the new context queue.

Message delegator 210 is a module that facilitates delegation/forwarding of message objects among multiple users. In an embodiment of the present invention, a message object is delegated according to a privacy level of the message object. The privacy level determines an allowed level of delegation of the message object and may be set by a generator of the message object. In another embodiment of the present invention, when a message object is marked as 'private', the message object cannot be delegated further.

In an exemplary embodiment of the present invention, a first user may receive a message object from a second user in an IM session. The first user may use message delegator 210 to delegate the message object to third and fourth users in order to seek their reply/opinion on the message object. In an embodiment of the present invention, when the message object is not marked as 'private', the third and fourth users may further delegate the message object to a fifth user in order to seek his reply/opinion. As a result, the message object is delegated two times and a level of delegation of the message object is two.

Reply aggregator 212 is a module that facilitates aggregation of one or more replies received for a message object in a context queue of the message object. In an embodiment of the present invention, when a first user delegates a query message object to a second and third user, reply aggregator 212 then aggregates replies received from the second and third users in a context queue of the query message. In another embodiment of the present invention, reply aggregator 212 may facilitate a user to read one or more replies. In yet another embodiment of the present invention, reply aggregator 212 may facilitate a user to select a reply to send to another user.

Message status detector 214 is a module that facilitates detecting of status of a message object in an IM session. In an embodiment of the present invention, when a user delegates a message object such as a query message to one or more users, a status of the query message may indicate status of arrival of one or more replies to the query message. The status of the query message may be updated when one or more replies to the query message arrive. In an embodiment of the present invention, when message status detector 214 detects arrival of one or more replies in a context queue of the query message, it updates the status of the query message.

Message moderator 216 is a module that facilitates moderating of content of one or more message objects in an IM session. The content of message objects is moderated by deleting, editing, or combining content of one or more message objects. In an embodiment of the present invention, content of one or more message objects may be moderated before delegation by a user. In another embodiment of the present invention, one or more replies received for a query message may be moderated before sending a reply to a receiver.

Message archiver 218 is a module that facilitates context based archiving of a message object in an IM session. In an embodiment of the present invention, message archiver 218 extracts one or more message objects from context queues 208 and archive them in a database at IM Server 114 (FIG. 1). In an exemplary embodiment of the present invention, a query message object and corresponding replies have similar context. Therefore, a set of the query message and replies may be archived in the database. The archived set of queries and replies may act as a tool for knowledge management. Archived message objects can also be used for back-up assignments in case of business critical conversations among users.

Message tagger 220 is a module that facilitates context based tagging of a message object in an IM session. In an embodiment of the present invention, message tagger 220 extracts one or more message objects from context queues 208 and tag them according to their corresponding contexts. In another embodiment of the present invention, message objects are tagged before archiving so as to facilitate easy search and retrieval of archived message objects from the database.

Message context maintainer 222 is a module that maintains multiple contexts/discussion threads in an IM session. In an embodiment of the present invention, multiple contexts/discussion threads are formed in an IM session due to context based queuing/categorization of message objects of the IM session. In various embodiments of the present invention, message context maintainer 222 may facilitate selective visibility of one or more message objects to one or more users in a multi-user IM session. One or more users who join in middle of a multi-user IM session can be restricted from viewing some message objects that may be generated prior to their joining the IM session. In an exemplary embodiment of the present invention, a multi-user IM session may comprise three contexts/discussion threads. When a new user joins in middle of the multi-user IM session, he may be restricted from viewing message objects of one discussion thread/context. In another exemplary embodiment of the present invention, a user may be restricted to view one or more message objects of a context, while visibility to other message objects of the context may be allowed. In yet another exemplary embodiment of the present invention, if a user inadvertently logs out from a multi-user IM session, and logs in again after some time, then he may be allowed to view message objects generated prior to his leaving the IM session, but he may be restricted to view messages objects generated during his absence.

Figure 3:
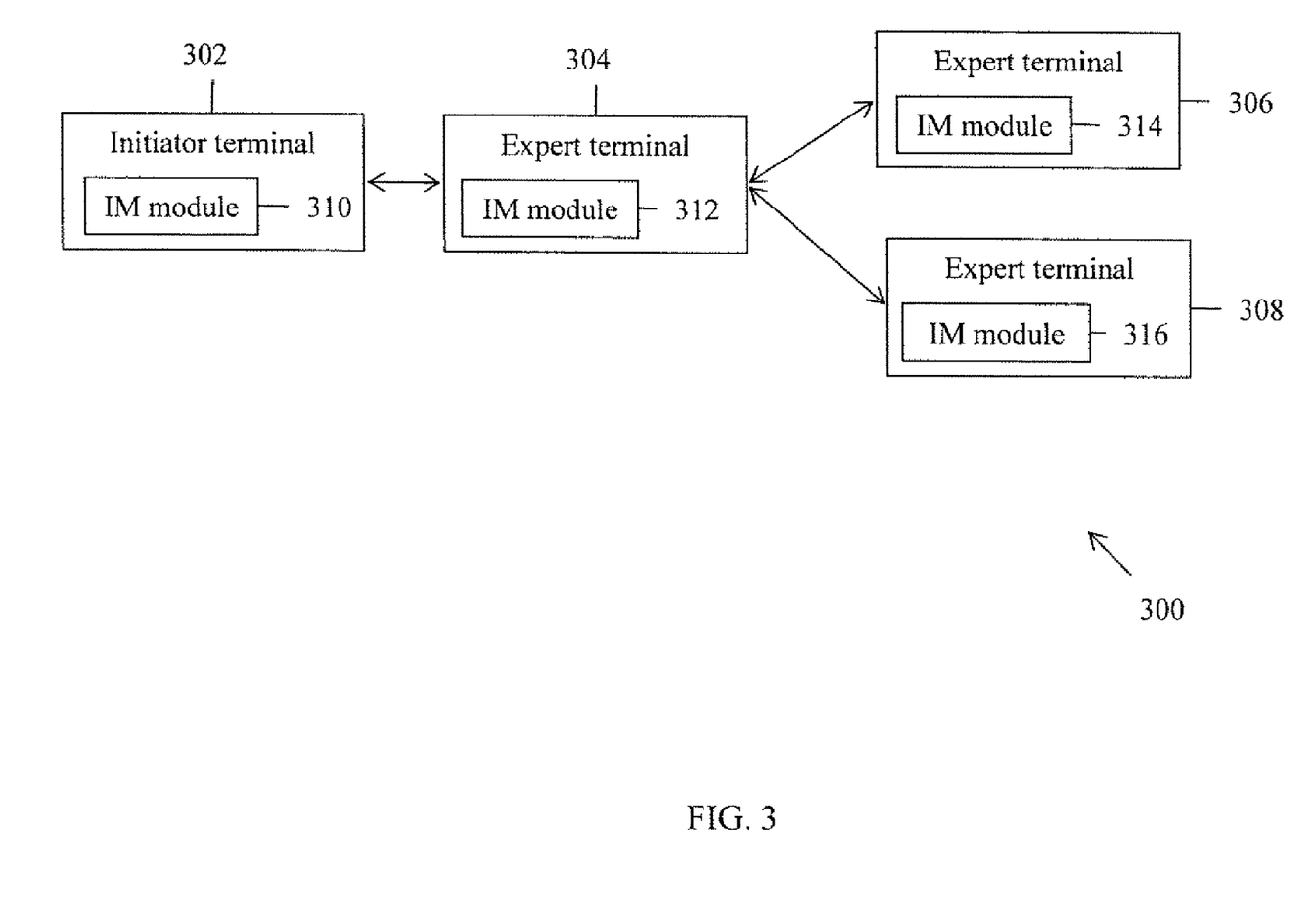
FIG. 3 illustrates a block diagram of a customer helpdesk environment that implements enhanced Instant Messaging of the present invention.

FIG. 3 illustrates a block diagram of a customer helpdesk environment 300 that implements enhanced IM of the present invention. Customer helpdesk environment 300 includes an initiator terminal 302, expert terminals 304, 306, and 308 and IM modules 310, 312, 314, and 316.

Customer helpdesk environment 300 is an environment where one or more customers may interact with a helpdesk support team to receive assistance on their queries/issues. In an embodiment of the present invention, the helpdesk support team is an information and assistance resource that addresses and resolves queries/issues faced by customers via enhanced IM. In various embodiments of the present invention, one or more customer helpdesk IM sessions may be initiated in customer helpdesk environment 300 for addressing customers queries through enhanced IM.

Initiator terminal 302 is a user terminal of a customer in customer helpdesk environment 300. In an embodiment of the present invention, the customer may initiate an IM session with the helpdesk support team to receive assistance on one or more issues/queries.

Expert terminal 304 is a user terminal of a 'level one' expert of the helpdesk support team. In an embodiment of the present invention, the 'level one' expert may have technical knowledge in one or more domains and may address queries related to those domains. In another embodiment of the present invention, the 'level one' expert may directly interact with a customer and resolve their queries in an IM session.

Expert terminals 306 and 308 are user terminals of 'level two' experts of the helpdesk support team. In an embodiment of the present invention, the 'level two' experts may have technical expertise in one or more domain and may address queries related to those domains. In another embodiment of the present invention, the 'level two' experts may not directly interact with a customer. In yet another embodiment of the present invention, the 'level two' experts may directly interact with a 'level one' expert through enhanced IM.

IM modules 310, 312, 314, and 316 are software entities that are installed on initiator terminal 302 and expert terminals 304, 306, and 308 respectively. IM modules 310, 312, 314, and 316 facilitate initiation of IM sessions among customers, 'level one' expert and 'level two' experts. In various embodiments of the present invention, IM modules 310, 312, 314, and 316 may provide features and services similar to IM module 202 (FIG. 2).

In an embodiment of the present invention, enhanced IM may be implemented in customer helpdesk environment 300 using single customer, single 'level one' expert, and multiple 'level two' experts. In another embodiment of the present invention, enhanced IM may be implemented in customer helpdesk environment 300 using multiple customers, and multiple 'level one' and 'level two' experts. In yet another embodiment of the present invention, enhanced IM may be implemented in customer helpdesk environment 300 using single customer, and multiple 'level one' and 'level two' experts.

Operationally, a customer may initiate a first IM session with a 'level one' expert by sending a query message directed towards the 'level one' expert. In an embodiment of the present invention, the 'level one' expert may not be able to reply to the query message and may search for a suitable reply in a database. In an embodiment of the present invention, the database may be present at IM Server 114 (FIG. 1) and may store one or more query-reply sets. In another embodiment of the present invention, the 'level one' expert may conduct a keyword based search for the query message in the database. If a suitable reply to the query message is found in the database, the 'level one' expert sends a reply to the customer.

In various embodiments of the present invention, the query message may be instantiated as a message object and may be assigned a context identifier in the first IM session. When the 'level one' expert does not find a suitable reply to the query message in the database, he/she may delegate the query message object to the 'level two' experts in order to receive their opinion/reply on the query message. In an embodiment of the present invention, the 'level one' expert may delegate the query message according to a privacy level of the query message object. In another embodiment of the present invention, the 'level one' expert may moderate the query message before delegation. In yet another embodiment of the present invention, the query message may be delegated to the 'level two' experts by simply clicking an option of 'delegate' associated with the query message object.

The 'level one' expert waits for opinions/replies from the 'level two' experts. When the 'level two' experts sends replies to the query message, a status of the query message changes indicating arrival of one or more replies. In an embodiment of the present invention, the status of the query message may be instantiated in the form a small status box associated with the message object. The color of the status box may change when a change in status of the query message is detected. In another embodiment of the present invention, when one or more replies arrive, the 'level one' expert may moderate the replies and send at least one reply to the customer. For the customer, the reply seems to appear from the 'level one' expert. In yet another embodiment of the present invention, the 'level one' expert may tag the query message. In yet another embodiment of the present invention, the 'level one' expert may archive the query message and corresponding replies in the database. The archived set of queries and replies can be used in future by the helpdesk support team when a similar type of query message is received.

Figure 4:
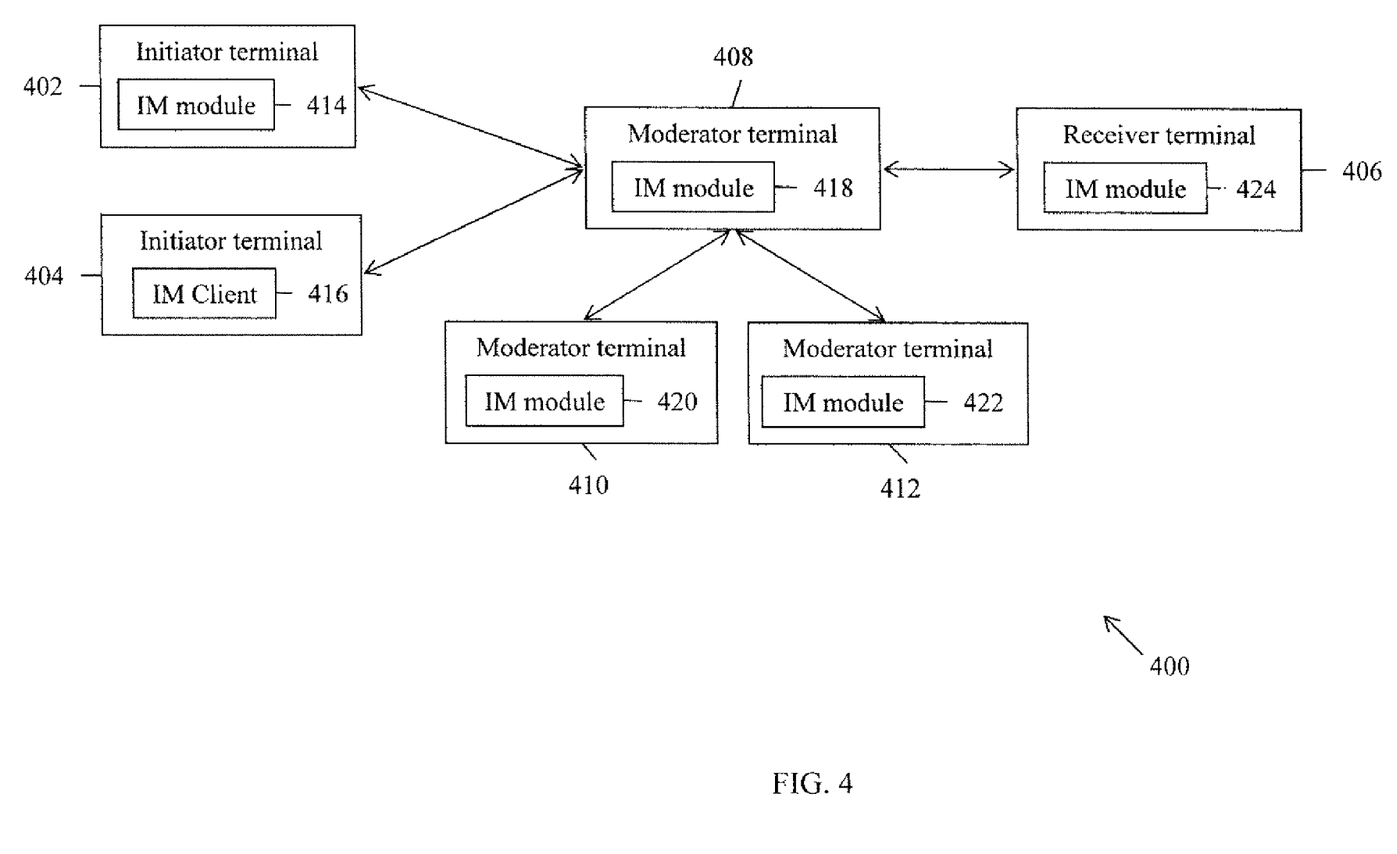
FIG. 4 illustrates a block diagram of an instant messaging environment with a distinguished user implementing enhanced Instant Messaging of the present invention.

FIG. 4 illustrates a block diagram of an exemplary instant messaging environment 400 with a distinguished user implementing enhanced IM of the present invention. Instant messaging environment 400 comprises initiator terminals 402 and 404, a receiver terminal 406, moderator terminals 408, 410 and 412, and IM modules 414, 416, 418, 420, 422, and 424.

Instant messaging environment 400 is an IM environment where one or more message initiators may interact with a distinguished user. In an embodiment of the present invention, the distinguished user may be a celebrity and message initiators may be users who want to interact with the distinguished user. In another embodiment of the present invention, the distinguished user may appear in an IM session to address query of one or more message initiators.

Initiator terminals 402 and 404 are user terminals of message initiators who wants to interact with a distinguished user. In an embodiment of the present invention, the message initiators may create query messages directed towards the distinguished user in an IM session.

Receiver terminal 406 is a user terminal of a distinguished user. In another embodiment of the present invention, the distinguished user may answer query messages of message initiators from a queue on his/her screen in an IM session. In another embodiment of the present invention, the distinguished user may ignore and delete query message of the message initiators.

Moderator terminal 408 is a user terminal of a lead moderator. In an embodiment of the present invention, the lead moderator is an interface between the message initiators and the distinguished user. The query messages sent by the message initiators for the distinguished user are received by the lead moderator. The lead moderator interacts with the distinguished user in a visually distinct IM session which is not visible to the users. In another embodiment of the present invention, the lead moderator may moderate the query messages of the message initiators before presenting them to the distinguished user. The lead moderator may moderate query messages by deleting/editing/combining multiple query messages. In yet another embodiment of the present invention, the lead moderator may steer the IM session in a direction desired by the distinguished user. The lead moderator may reorder the queue of query messages on the distinguished user's screen and provide helpful hints/suggestions to him/her. In yet another embodiment of the present invention, the distinguished user can ask a question in confidence to the lead moderator.

Moderator terminals 410 and 412 are user terminals of a first sub-moderator and a second sub-moderator respectively. The first and second sub-moderators are moderators that interact with the lead moderator and moderate the query messages received from the lead moderator. The first and second sub-moderators have a context of what a distinguished user would prefer/avoid to discuss in an IM session. In various embodiments of the present invention, the first and second sub-moderators may moderate the query messages and send them to the lead moderator. In an embodiment of the present invention, a sub-moderator may delete a message object. In another embodiment of the present invention, a sub-moderator may block a message initiator from sending further query messages. In yet another embodiment of the present invention, a sub-moderator may rephrase/edit the query message and send it to the lead moderator.

IM modules 414, 416, 418, 420, 422 and 424 are software entities that are installed on initiator terminals 402 and 404, a receiver terminal 406, and moderator terminals 408, 410, and 412, respectively. IM modules 414, 416, 418, 420, 422, and 424 facilitate initiation of IM sessions among message initiators, lead moderator, sub-moderators and distinguished user. In various embodiments of the present invention, IM modules 414, 416, 418, 420, 422 and 424 may provide features and services similar to IM module 202 (FIG. 2).

In an embodiment of the present invention, enhanced IM may be implemented in instant messaging environment 400 using multiple message initiators, single lead moderator, and multiple sub-moderators. In another embodiment of the present invention, enhanced IM may be implemented in instant messaging environment 400 using multiple message initiators, multiple lead moderators and sub-moderators.

Operationally, one or more message initiators may generate multiple query messages for a distinguished user in an IM session. The multiple query messages directed towards the distinguished user are received by a lead moderator. In various embodiments of the present invention, the query messages may be instantiated as message objects and may be assigned context identifiers in the IM session. In an embodiment of the present invention, the lead moderator may not be able to moderate query messages in detail and may delegate query messages to first and second sub-moderators. The query messages are delegated to the first and second sub-moderators in order to receive moderated/edited query messages. In another embodiment of the present invention, the lead moderator may moderate the query messages before delegation. In yet another embodiment of the present invention, a query message may be delegated to a sub-moderator by clicking an option of 'delegate' associated with the query message object.

The lead moderator waits for moderated query messages from the first and second sub-moderators. In an embodiment of the present invention, the lead moderator may compile the moderated query messages received from the sub-moderators. The compiled query messages are presented to the distinguished user in a separate IM session in a sequence deemed appropriate by the lead moderator.

In an embodiment of the present invention, the distinguished user may respond to at least one query message and send one or more replies to the lead moderator. The lead moderator may moderate the replies directed towards message initiators and send them to the message initiators. In another embodiment of the present invention, the distinguished user may send one or more replies to the message initiators directly without involving the lead moderator. In yet another embodiment of the present invention, the distinguished user may not respond to one or more query messages and the lead moderator may send replies to the message initiators on behalf of the distinguished user. In yet another embodiment of the present invention, neither distinguished user nor the lead moderator responds to one or more query messages of message initiators.

In various embodiments of the present invention, the received replies may be aggregated in context queues of the corresponding query messages. The arrival of a reply to the query message is detected at a user terminal of a message initiator. For the message initiator, the reply seems to appear from the distinguished user. In yet another embodiment of the present invention, the message initiator may tag and archive a set of the query and reply in a database.

Figure 5:
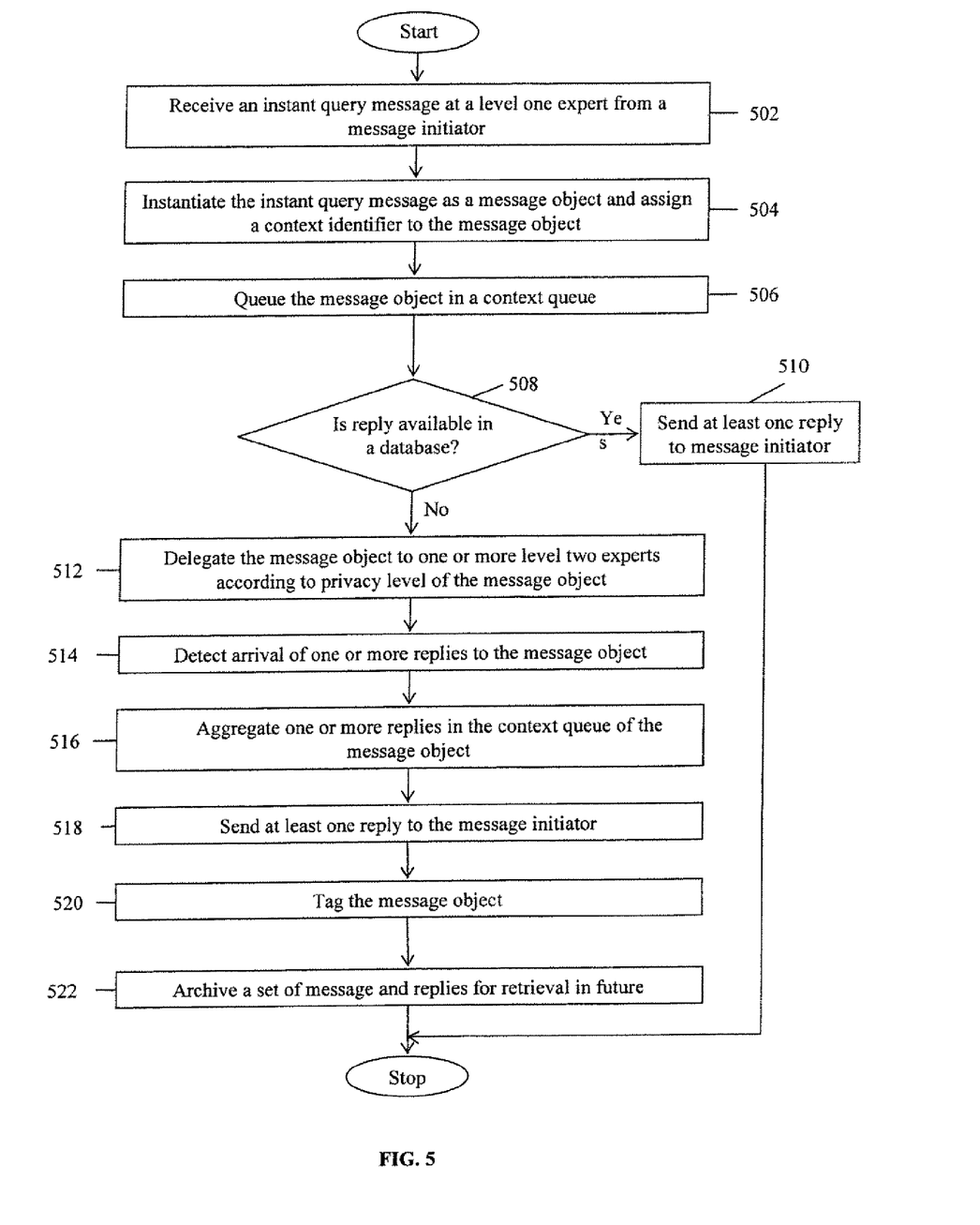
FIG. 5 is a flowchart illustrating a method of enhanced Instant Messaging in a customer helpdesk environment.

FIG. 5 is a flowchart illustrating a method of enhanced instant messaging in a customer helpdesk environment.

At step 502, an instant query message is received at a 'level one' expert from a message initiator in an IM session. In various embodiments of the present invention, the IM session may be initiated in a customer helpdesk environment, the message initiator may be a customer, and the instant query message may be a query message directed towards the 'level one' expert.

At step 504, the instant query message is instantiated as a message object and a context identifier is assigned to the message object. The context identifier is assigned based on context of the message object. At step 506, the message object is queued into a context queue. The context queue is assigned based on context of the message object.

At step 508, a check is performed to ascertain whether a reply for the message object is available in a database at the IM Server. In various embodiments of the present invention, the database stores a list of query-reply sets. If a query-reply set is present for the message object, then at step 510, at least one reply from reply set is sent to the message initiator.

If a query-reply set is not available for the message object, then at step 512, the message object is delegated to one or more 'level two' experts according to a privacy level of the message object. In various embodiments of the present invention, the message object may be delegated in order to receive opinions/replies on the message object.

At step 514, an arrival of one or more replies to the message object is detected. In various embodiments of the present invention, one or more replies are sent by 'level two' experts to the 'level one' expert. Further, a status of the message object is changed when one or more replies to the message object arrives.

At step 516, one or more replies to the message object are aggregated in the context queue of the message object. In various embodiments of the present invention, the one or more replies may be moderated at the 'level one' expert. The replies may be moderated by editing and combining one or more replies.

Further, at step 518, at least one reply is sent to the message initiator. In various embodiments of the present invention, the 'level one' expert may select at least one reply from the moderated replies and send to the message initiator.

At step 520, the message object is tagged according to context of the message object. In various embodiments of the present invention, the tagging of the message object facilitates easy search and retrieval when a similar message object is received in future.

Finally, at step 522, one or more replies to the message object are archived as a set of message and replies in the database at the IM Server. In various embodiments of the present invention, the archived sets of message and replies are useful when a similar type of message object is received in future.

Figure 6:
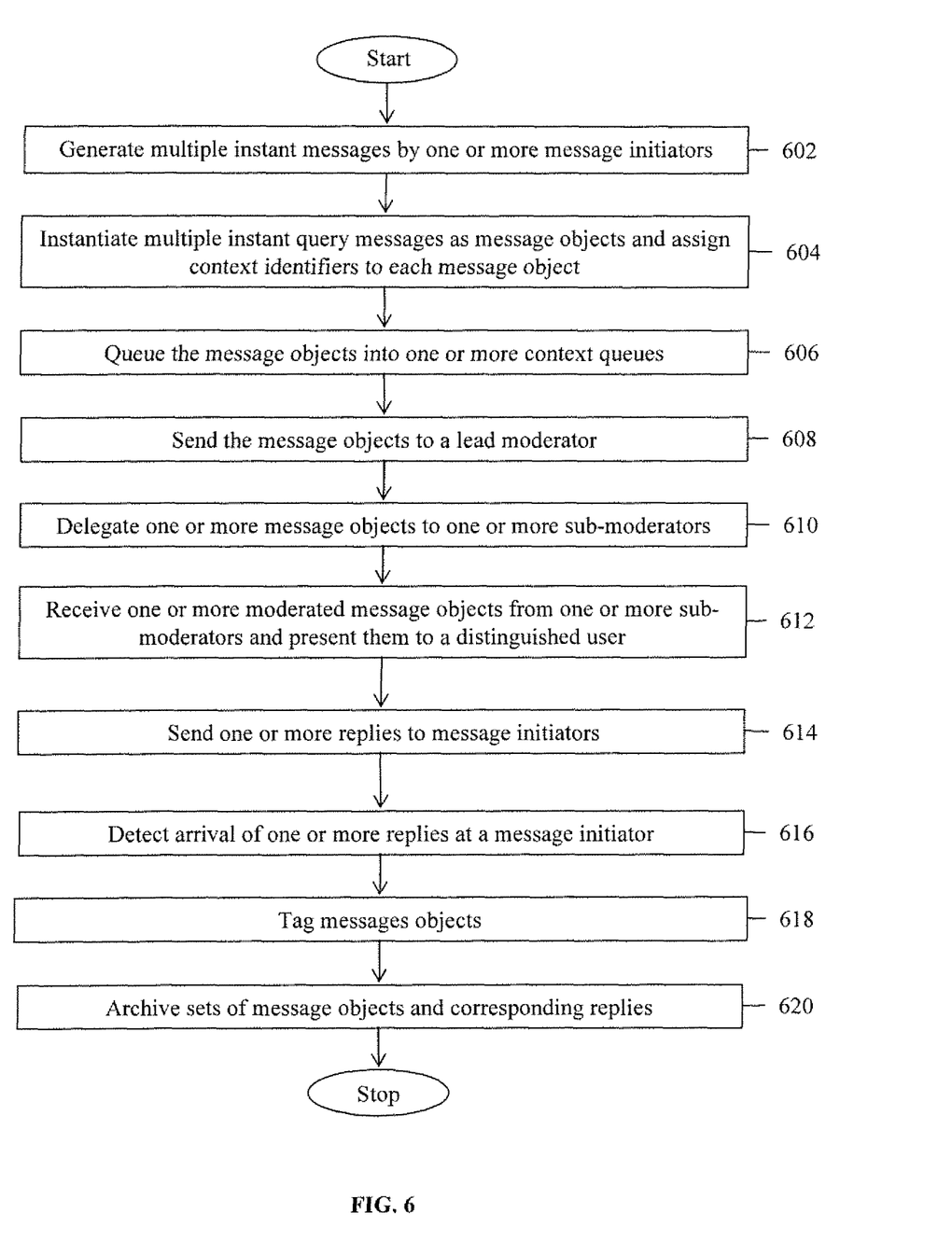
FIG. 6 is a flowchart illustrating a method of enhanced Instant Messaging in an instant messaging environment with a distinguished user.

FIG. 6 is a flowchart illustrating a method of enhanced instant messaging in an instant messaging environment with a distinguished user.

At step 602, multiple instant query messages are generated by one or more message initiators in an IM session with a distinguished user. In various embodiments of the present invention, the message initiators may be followers of the distinguished user, and multiple instant query messages may be queries directed towards the distinguished user.

At step 604, the multiple instant query messages are instantiated as message objects and context identifiers are assigned to each message object.

At step 606, each message object is being queued into one or more context queues. In various embodiments of the present invention, the context queues are present at an IM Server.

At step 608, the message objects are sent to a lead moderator. In various embodiments of the present invention, the lead moderator may moderate content of the message objects. The content of message objects may be moderated by deleting, editing or combining one or more message objects.

At step 610, one or more message objects are delegated to one or more sub-moderators by the lead moderator. In various embodiments of the present invention, the one or more sub-moderators may moderate content of the delegated message objects and send them to the lead moderator. In an embodiment of the present invention, a sub-moderator may delete a delegated message object. In another embodiment of the present invention, a sub-moderator may block a message initiator from sending further instant query messages. In yet another embodiment of the present invention, a sub-moderator may rephrase/edit a delegated message object and send it to the lead moderator.

At step 612, one or more message objects received by the lead moderator from the sub-moderators are presented to the distinguished user. In various embodiments of the present invention, the lead moderator compiles and arranges received message object in a sequence deemed appropriate by the distinguished user. The lead moderator then presents them to the distinguished user in an IM session that is not visible to the message initiators and sub-moderators.

At step 614, one or more replies are sent to the message initiators. In various embodiments of the present invention, the one or more replies are sent by either the distinguished user or by the lead moderator. In an embodiment of the present invention, the distinguished user may directly send a reply to a message initiator without involving the lead moderator. In another embodiment of the present invention, the distinguished user may send one or more replies to the lead moderator. The lead moderator may moderate the replies directed towards message initiators and send them to message initiators. In yet another embodiment of the present invention, the distinguished user may not respond to one or more query messages and the lead moderator may send replies to the message initiators on behalf of the distinguished user. The replies sent to the message initiators are aggregated in context queues of the corresponding query message objects.

At step 616, an arrival of a reply to a message object is detected at a message initiator. In an embodiment of the present invention, the reply is sent by the lead moderator.

At step 618, the message object is tagged according to the context of the message object. In various embodiments of the present invention, the message object is tagged for an easy search and retrieval.

Finally, at step 620, one or more replies to the message object are archived as a set of message and replies. In various embodiments of the present invention, the sets of messages and replies are archived for reuse in future for the similar type of query message.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method of enhanced instant messaging in a communication network, the method comprising:
receiving one or more query messages from a message initiator and instantiating the one or more query messages as message objects, wherein the one or more query messages correspond to multiple contexts;
assigning a context identifier and a context queue to each of the received query message objects based on context of each of the query message objects;
delegating the one or more query message objects to one or more users based on at least the context of the one or more query messages if one or more replies corresponding to the one or more query message objects are not available in a database, wherein the one or more replies to the one or more received query message objects are searched from one or more query message objects and corresponding replies stored in the database, the one or more query message objects being tagged based on at least the context associated with the one or more query message objects and corresponding replies;
aggregating one or more reply message objects received for each of the query message objects from the one or more users in respective context queues of the query message objects, wherein respective context queues facilitate queuing of the reply message objects of similar context; and
sending at least one reply for each of the query messages to the message initiator.

2. The method of claim 1, wherein the one or more query message objects are delegated according to a privacy level of the message object, wherein the privacy level determines an allowed level of delegation of the query message to one or more users.

3. The method of claim 1 further comprising detecting by a first user of the delegated query message objects arrival of one or more replies to the query message objects from one or more receivers of the delegated query message objects.

4. The method of claim 1 further comprising moderating one or more replies by the one or more users of the delegated query messages prior to sending at least one reply to the message initiator.

5. The method of claim 1 further comprising:
extracting query message objects and corresponding reply message objects from the respective context queues;
tagging the one or more extracted query message objects and the corresponding reply message objects; and
archiving the one or more query message objects and corresponding reply message objects in the database.

6. The method of claim 1, wherein one or more users are technical experts of a customer helpdesk environment.

7. The method of claim 1, wherein an instant message is one of the following: text message, image message, audio message, or video message.

8. A method of enhanced instant messaging in an instant messaging environment with a distinguished user, the method comprising:
receiving one or more query messages from a message initiator and instantiating the one or more query messages as message objects, wherein the one or more query messages correspond to multiple contexts;
assigning a context queue and a context identifier to each of the received message objects based on context of each of the query message objects;
sending the one or more query message objects to one or more moderator terminals of one or more lead moderators;
delegating one or more message objects to one or more moderator terminals of the sub-moderators by the lead moderator if one or more replies corresponding to the one or more query message objects are not available in a database, wherein the one or more replies to the one or more received query message objects are searched from one or more query message objects and corresponding replies which are archived in the database, the one or more query message objects being tagged based on at least a context associated with the one or more query message objects and corresponding replies;
receiving moderated message objects from one or more sub-moderators; and
presenting the moderated message objects to a distinguished user by the one or more lead moderators.

9. The method of claim 8 further comprising moderating one or more message objects prior to delegating message objects to one or more sub-moderators.

10. The method of claim 8 further comprising compiling and arranging the moderated message objects in a sequence preferred by the distinguished user, wherein the moderated message objects are at least rephrased, edited, deleted and compiled message objects.

11. The method of claim 8 further comprising:
receiving one or more replies by the lead moderator from the distinguished user;
moderating one or more replies; and
sending one or more replies to one or more message initiators.

12. The method of claim 11 further comprising the steps of:
detecting arrival of one or more reply message objects at one or more message initiators;
extracting query message objects and corresponding reply message objects from the respective context queues;
tagging the one or more extracted query message objects and the corresponding reply message objects; and
archiving the one or more query message objects and corresponding reply message objects in a database.

13. An instant messaging module stored in a memory for facilitating enhanced instant messaging in a communication network, the instant messaging module comprising:
a message generator configured to
receive one or more query messages from a message initiator, wherein the one or more query messages correspond to multiple contexts;
represent the received one or more query messages as message objects; and
assign a context identifier to each of the received query message objects based on context of each of the query message objects;
a message queue manager configured to
assign a context queue to each of the received query message objects based on a context and a content of each of the query message objects;
a message delegator configured to
delegate the one or more query message objects to one or more users based on at least the context of the one or more query messages if one or more replies corresponding to the one or more query message objects are not available in a database, wherein the one or more replies to the one or more received query message objects are searched from one or more query message objects and corresponding replies stored in the database, the one or more query message objects being tagged based on at least a context associated with the one or more query message objects and corresponding replies;
a reply aggregator configured to
aggregate one or more reply message objects received for each of the query message objects from the one or more users in respective context queues of the query message objects, wherein respective context queues facilitate queuing of the reply message objects of similar context;
a message status detector configured to
detect an arrival of one or more replies to the message object;
a message tagger configured to
extract query message objects and corresponding reply message objects from the respective context queues;
tag the one or more extracted query message objects and the corresponding reply message objects; and
a message archiver configured to
archive the one or more query message objects and corresponding reply message objects in the database.

14. The instant messaging module of claim 13 further comprising a message moderator configured to moderate content of one or more message objects of the one or more users of the delegated query messages prior to sending at least one reply to the message initiator.

15. The instant messaging module of claim 13 further comprising a message context maintainer configured to maintain multiple contexts in an instant messaging session based on the context based queuing of the query message objects and the corresponding reply message objects.

* * * * *